United States Patent [19]

Ohta et al.

[11] Patent Number: 5,124,431
[45] Date of Patent: Jun. 23, 1992

[54] PROCESS FOR PRODUCING AZO GROUP-CONTAINING POLYMER HAVING AZO GROUP IN MAIN CHAIN

[75] Inventors: Takayuki Ohta, Sagamihara; Shiho Sano, Machida; Ryoko Aso, Yokohama, all of Japan

[73] Assignee: Mitsubishi Kasei Corporation, Tokyo, Japan

[21] Appl. No.: 593,301

[22] Filed: Oct. 3, 1990

Related U.S. Application Data

[63] Continuation of Ser. No. 276,078, Nov. 23, 1988, abandoned.

[30] Foreign Application Priority Data

Nov. 25, 1987 [JP] Japan ................. 62-296449
Feb. 4, 1988 [JP] Japan ................. 63-24528
Mar. 16, 1988 [JP] Japan ................. 63-63007
Mar. 16, 1988 [JP] Japan ................. 63-63008

[51] Int. Cl.$^5$ ............ C08G 63/00; C08G 69/26; C08G 69/44
[52] U.S. Cl. ............ 528/183; 528/171; 528/176; 528/184; 528/185; 528/196; 528/203; 528/272; 528/289; 528/291; 528/335
[58] Field of Search ............ 528/176, 183, 184, 185, 528/196, 203, 272, 289, 291

[56] References Cited

U.S. PATENT DOCUMENTS

| | | | |
|---|---|---|---|
| 3,909,497 | 9/1975 | Hendry et al. | 528/505 |
| 3,914,340 | 10/1975 | Dekking | 525/267 |
| 4,101,522 | 7/1978 | Sheppard et al. | 528/292 |

FOREIGN PATENT DOCUMENTS 59-27908 2/1984 Japan ................. 534/573
1234581 6/1971 United Kingdom .

OTHER PUBLICATIONS

Macromolecules vol. 20, No. 8, 1987, pp. 2041–2044 "New Polyesters & Polyformals Containing Multiple p-Aryleneazo Groups: Liquid-Crystal Polyazoaryl Sebacates", H. K. Hall et al.
R. Kerber, et al., Macrmol. Chem, 180:609–614 (1979).
V. B. Vollmert & H. Bolte, Macromol. Chem. 36:17–24 (1959).
J. Furukawa, et al. Agnes. Makromol. Chem. 1:92–104 (1967).
A. Ueda and S. Nagai, J. Polym. Sci.: Part A Polym. Chem. 24: 405–418 (1986).

*Primary Examiner*—John Kight, III
*Assistant Examiner*—P. Hampton-Hightower
*Attorney, Agent, or Firm*—David G. Conlin; Linda M. Buckley

[57] ABSTRACT

Disclosed herein is a process for producing an azo group-containing polymer comprising polycondensing a compound having an azo group in the main molecular chain and an alcoholic hydroxyl group, phenolic hydroxyl group, imino group or amino group at both ends thereof with a dicarboxylic acid chloride or a carbonate precursor except the polycondensation of a compound having an azo group in the main molecular chain and an alcoholic hydroxyl group at both ends thereof with a carbonate precursor.

8 Claims, No Drawings

PROCESS FOR PRODUCING AZO GROUP-CONTAINING POLYMER HAVING AZO GROUP IN MAIN CHAIN

This is a continuation of copending U.S. application Ser. No. 07/276,078 filed on Nov. 23, 1988 now abandoned.

BACKGROUND OF THE INVENTION

The present invention relates to a process for producing an azo group-containing polymer having an azo group in the main chain of a high polymer (hereinafter referred to as "azo group-containing polymer").

Azo compounds, which are generally decomposed by heat and produce radicals, serve as polymerization initiators. The azo compounds are also useful as modifiers and compatibilizers of various resins.

As to a method of synthesizing a polymer having an easily decomposable azo group, the following methods, for example, have been proposed:

(1) a method of producing a polymer having an azo group in a side chain by copolymerizing a vinyl monomer having an azo group in a side chain with another vinyl monomer (Makromol. Chem..180 609 (1979)), (2) a method of producing a polymer having an azo group in a side chain by reacting a hydroxyl group containing polymer with a carboxyl group-containing azo compound (Makromol. Chem.,36 17 (1959)), (3) a method of producing a polyurethane containing an azo group in the main chain by reacting a glycol having an azo group with a diisocyanate compound (Angew. Makromol. Chem., 1 92 (1967)), (4) a method of synthesizing an azo group-containing polyamide or polyester from a dicarboxylic acid chloride and a diamine or a glycol (Polymer Theses 33 (3) 131 (1976), J. Polym. Sci. A Polym. Chem.,24 406 (1986)), and (5) a method of producing a polycarbonate having an azo group in the main chain from an azo group-containing dicarboxylic acid chloride and bisphenol A (Japanese Patent Laid-Open (KOKAI) No. 59-27908 (1984)).

Any of the azo group-containing polymers produced by these methods is a material useful for the production of a block copolymer and a graft copolymer. These methods, however, have the following defects. For example, in the method (1), the synthesis of an azo group-containing vinyl monomer is complicated, while in the method (2), it is difficult to completely react an azo compound in the polymerization reaction. The methods (4) and (5) are complicated because it is necessary to synthesize an azo group-containing dicarboxylic acid chloride before the synthesis of an azo group-containing polymer. As to the method (5), it is described that an azo group-containing polycarbonate resin can be produced by using an azo group-containing diacid halide, diol, dialkylene halide and dicarboxylic acid, but interfacial polymerization is difficult except for using diacid halide.

As a result of the studies undertaken for solving the above-described defects, the present inventors have found that it is relatively easy to produce an azo group-containing polymer by the polycondensation of a compound which has an azo group in the main molecular chain and an alcoholic hydroxyl group, phenolic hydroxyl group, imino group or amino group at both ends thereof, with a dicarboxylic acid chloride or a carbonate precursor (except for the polycondensation of a compound having an azo group in the main molecular chain and an alcoholic hydroxyl group at both ends thereof, with a carbonate precursor). The present invention has been achieved on the basis of this finding.

SUMMARY OF THE INVENTION

In a first aspect of the present invention, there is provided a process for producing an azo group-containing polymer comprising polycondensing a compound having an azo group in the main molecular chain and an alcoholic hydroxyl group, phenolic hydroxyl group, imino group or amino group at both ends thereof with a dicarboxylic acid chloride or a carbonate precursor except the polycondensation of a compound having an azo group in the main molecular chain and an alcoholic hydroxyl group at both ends thereof with a carbonate precursor.

In a second aspect of the present invention, there is provided a process for producing an azo group-containing polymer comprising reacting a compound having an azo group in the main molecular chain and an alcoholic hydroxyl group at both ends thereof with a dicarboxylic acid chloride, and polycondensing the reaction product obtained with a carbonate precursor.

DESCRIPTION OF THE PREFERRED EMBODIMENTS (1) The compound having an azo group in the main molecular chain and an alcoholic hydroxyl group at both ends thereof which is used in the present invention is exemplified by azobisalcohols represented by the following general formulas (I) to (IV):

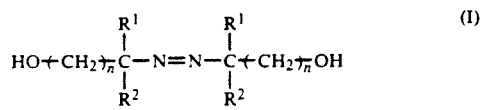

wherein $R^1$ and $R^2$ each represent a hydrogen atom, a lower alkyl group, preferably $(C_1-C_3)$ alkyl group, a nitril group or an aromatic group, and n represents an integer of from 1 to 10.

The azobisalcohols represented by the general formula (I) are, for example;

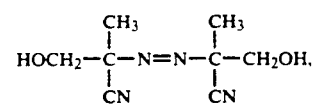

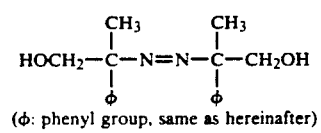

(φ: phenyl group, same as hereinafter)

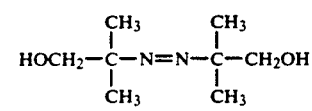

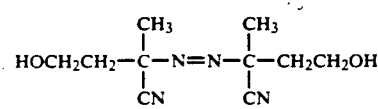

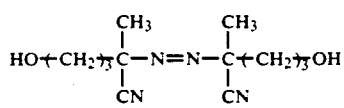

-continued and

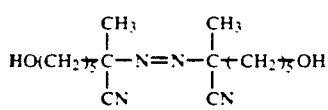

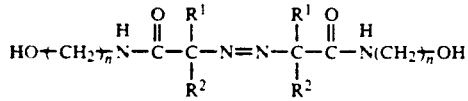

(II)

wherein $R^1$, $R^2$ and n are the same as defined above.

Examples of the azobisalcohols represented by the general formula (II) are:

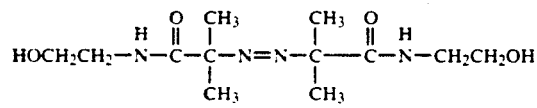

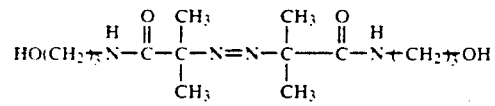

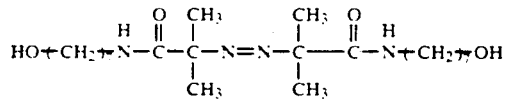

and

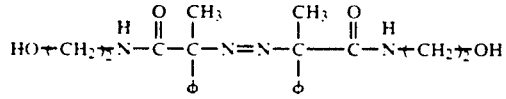

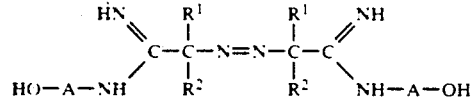

(III)

wherein $R^1$ and $R^2$ are the same as defined above and A represents a lower alkylene group, preferably ($C_2$-$C_4$) alkylene group.

Examples of the azobisalcohols represented by the general formula (III) are:

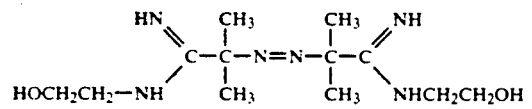

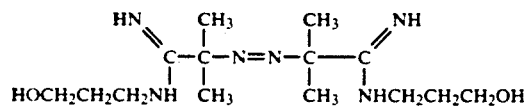

and

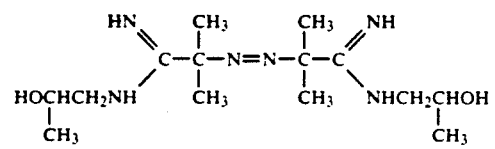

-continued

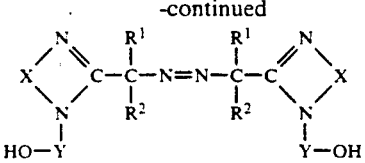

(IV)

wherein X and Y represent a bivalent organic group, and $R^1$ and $R^2$ represent a hydrogen atom, a lower alkyl group, preferably ($C_1$-$C_3$) alkyl group, a nitrile group or an aromatic group.

The azobisalcohols represented by the general formula (IV) are, for example:

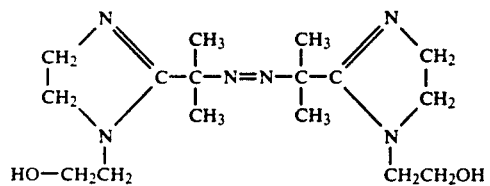

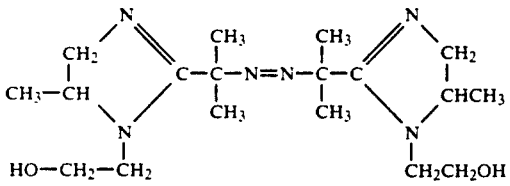

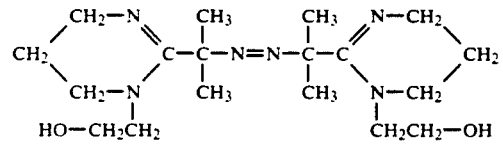

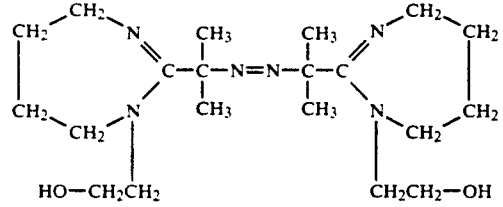

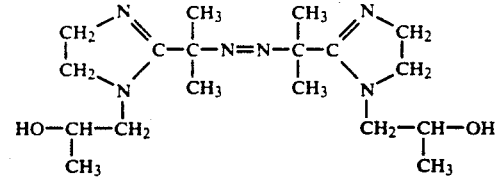

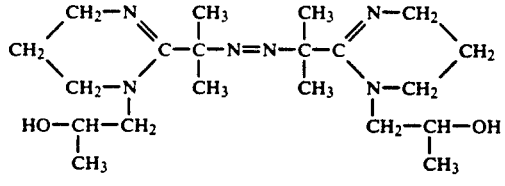

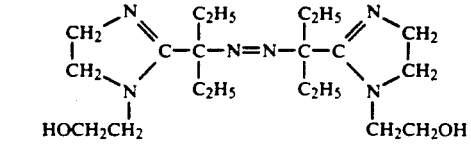

and

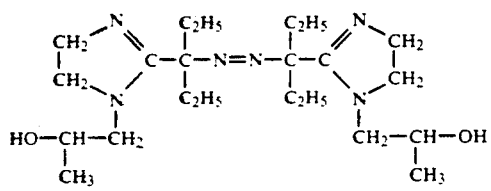

(2) The compound having an azo group in the main molecular chain and a phenolic hydroxyl group at both ends thereof which is used in the present invention is, exemplified by azobisphenols represented by the general formulas (V) and (VI), the chlorides thereof and the hydrates thereof:

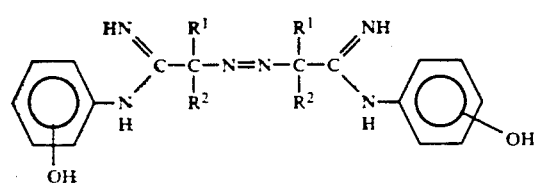 (V)

wherein $R^1$ and $R^2$ represent a hydrogen atom, a lower alkyl group, preferably ($C_1$-$C_3$) alkyl group, a nitrile group or an aromatic group.

Examples of the azobisphenols represented by the general formula (V) are:

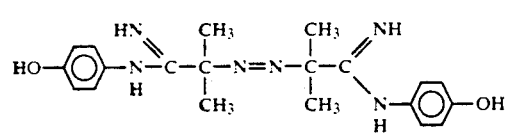

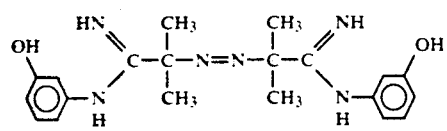

and

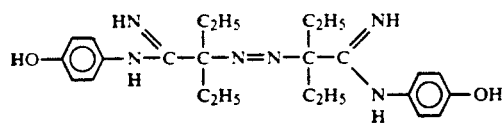

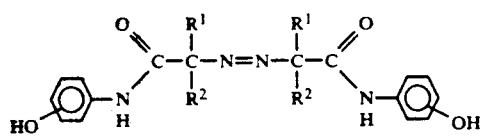 (VI)

wherein $R^1$ and $R^2$ are the same as defined above.

Examples of the azobisphenols represented by the general formula (VI) are:

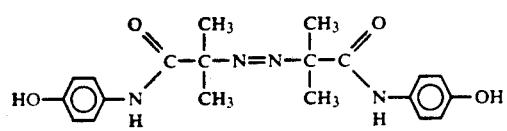

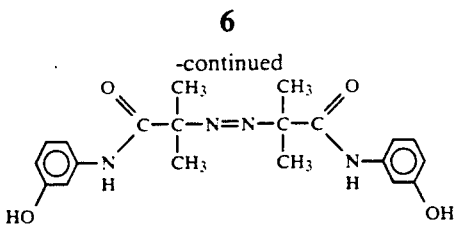

and

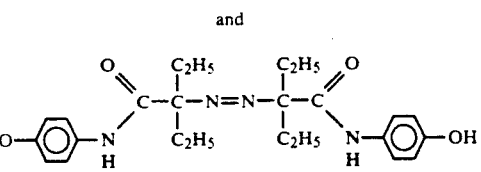

(3) The compound having an azo group in the main molecular chain and an imino group at both ends thereof which is used in the present invention is exemplified by azobisimines represented by the general formula (VII), the chlorides thereof and the hydrates thereof:

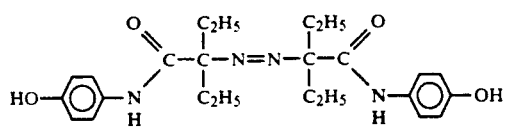 (VII)

wherein R represents a bivalent organic group, and $R^1$ and $R^2$ are the same as defined above.

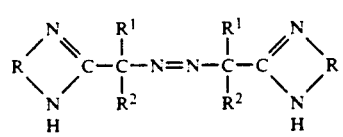

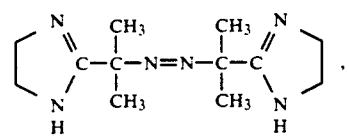

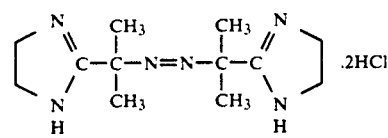

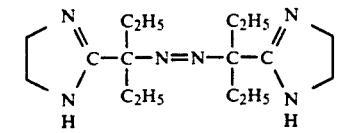

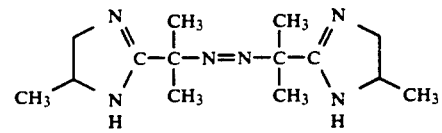

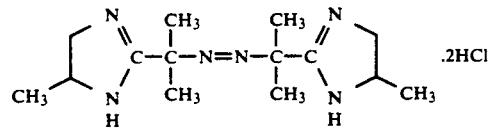

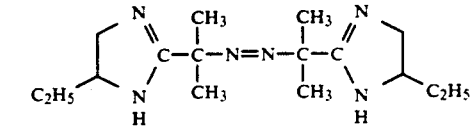

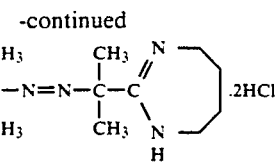

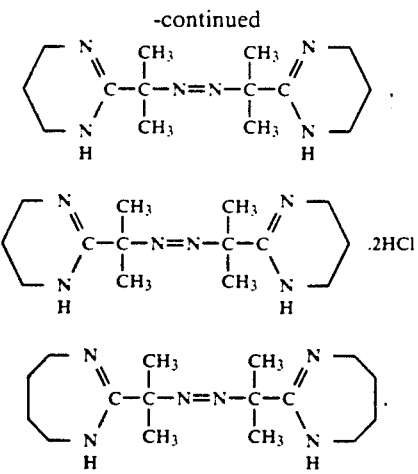

and (4) The compound having an azo group in the main molecular chain and an amino group at both ends thereof which is used in the present invention is exemplified by azobisamines represented by the general formulas (VIII) and (IX), the chlorides thereof and the hydrates thereof:

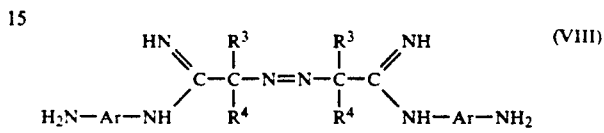

wherein $R^3$ and $R^4$ each represent a hydrogen atom, a lower alkyl group, preferably ($C_1$-$C_3$) alkyl group or an aromatic group, and Ar represents a bivalent aromatic group.

Examples of the azobisphenols represented by the general formula (VIII) are:

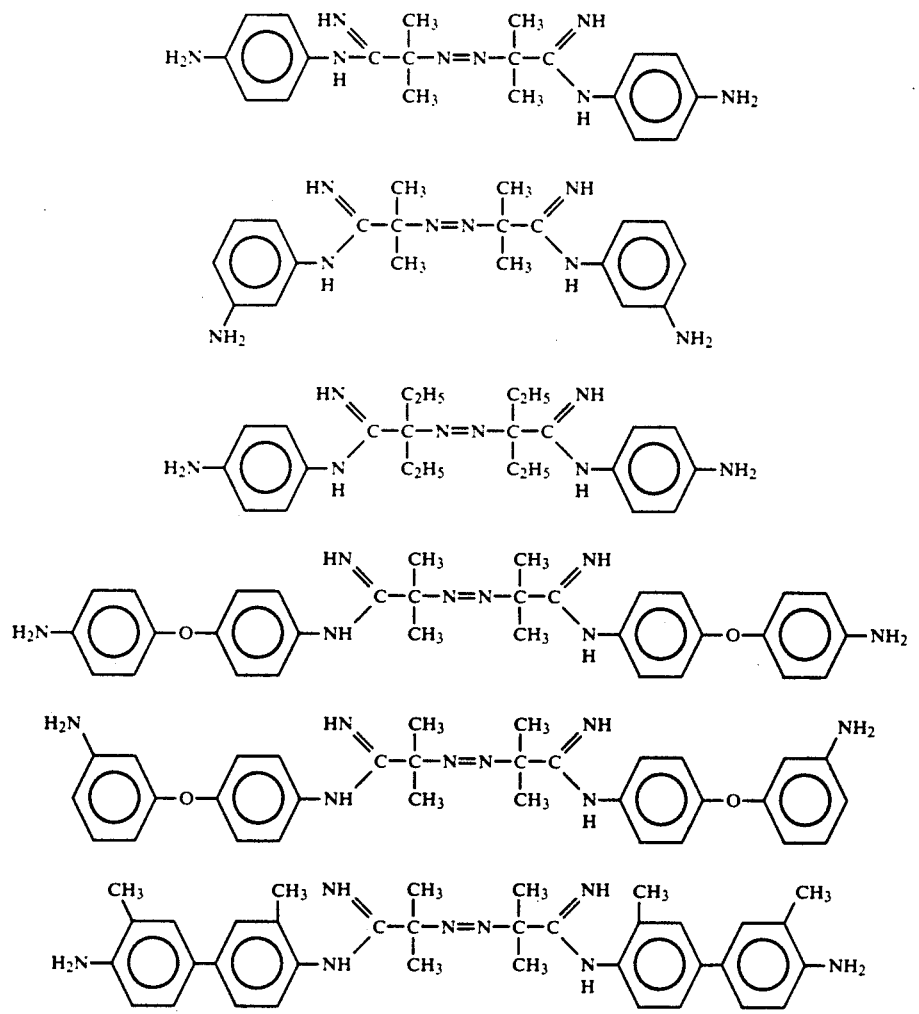

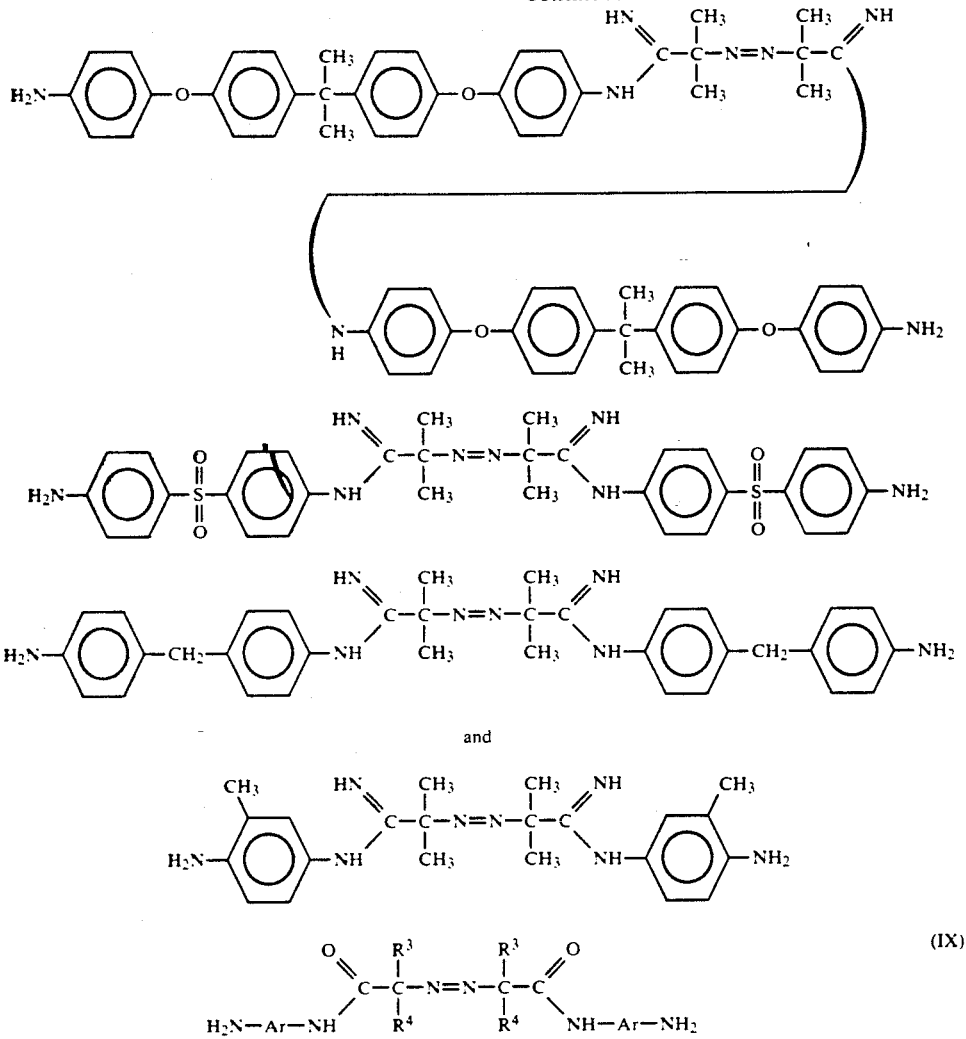
wherein $R^3$, $R^4$ and Ar each represent the same as defined above.
Examples of the azobisphenols represented by the general formula (IX) are:
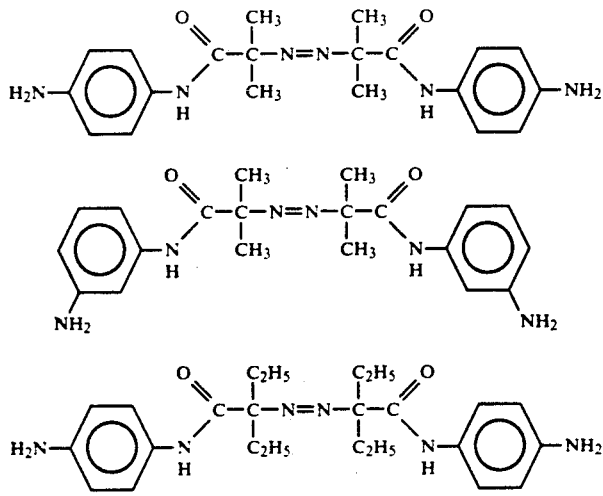

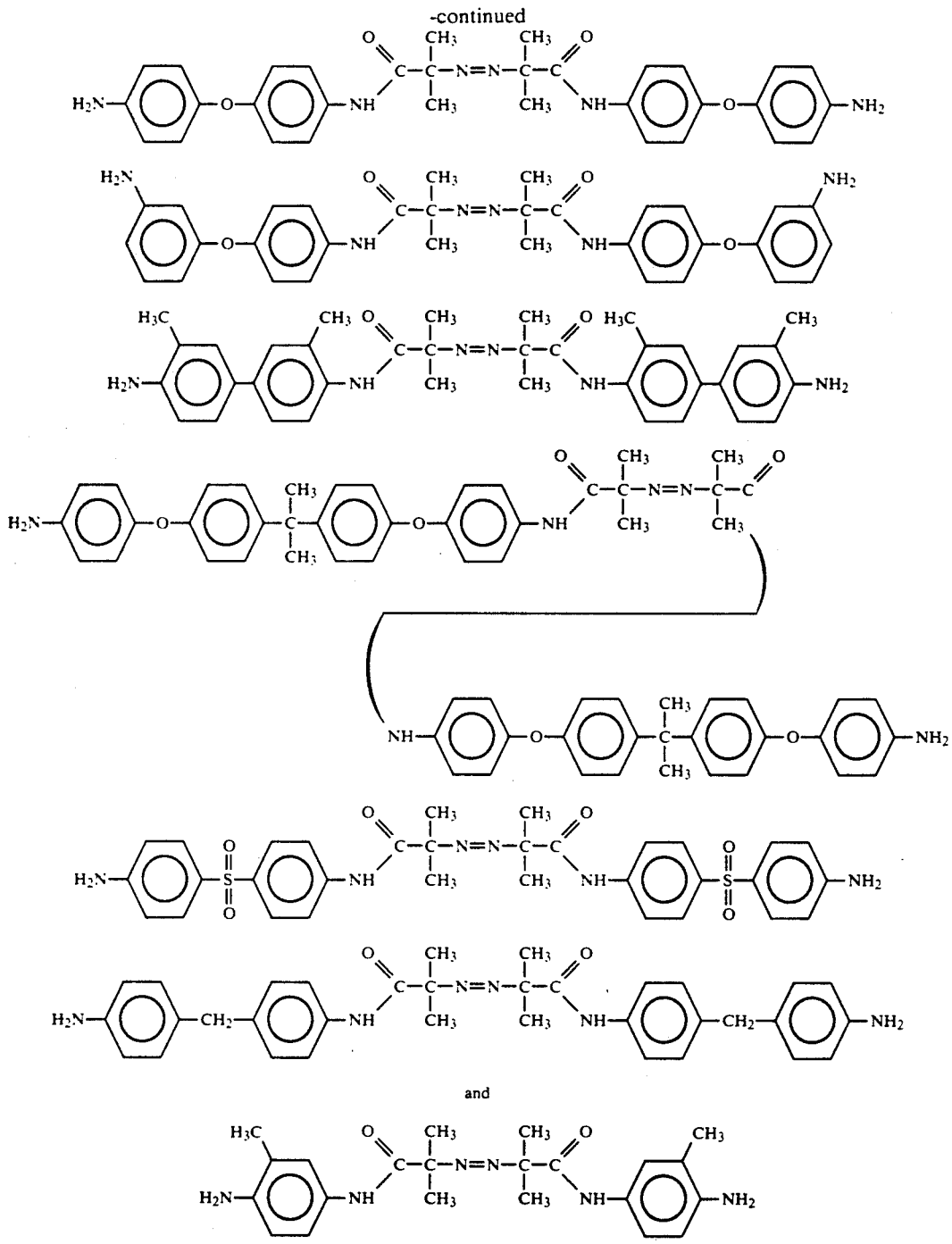

In the present invention, these compounds having an azo group in the main molecular chain may be used either singly or in the form of a mixture.

Other compounds having an azo group in the main molecular chain which are used in the present invention are exemplified by azobisamines represented by the following general formula (X), the chlorides thereof and the hydrates thereof:

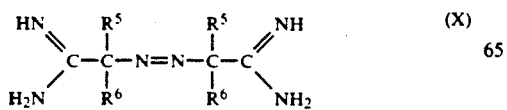

(X)

wherein $R^5$ and $R^6$ each represent a hydrogen atom, a lower alkyl group, preferably ($C_1$-$C_3$) alkyl group or an aromatic group.

Examples of the azobisamines represented by the general formula (X) are:

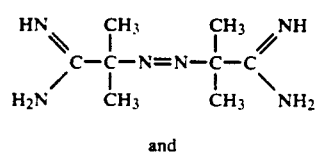

and

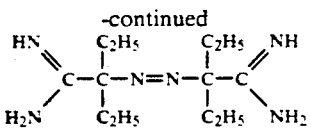

(5) Dicarboxylic acid halides used in the present invention are, particularly, the dichlorides of aliphatic, alicyclic or aromatic dicarboxylic acids. For example, the dichlorides of aromatic dicarboxylic acids such as terephthalic acid, isophthalic acid, diphenylmethane dicarboxylic acid, 1,4-naphthalene dicarboxylic acid, 2,6-naphthalene dicarboxylic acid, 4,4'-diphenyl dicarboxylic acid, 3,3'-diphenyl dicarboxylic acid, 2,2'-diphenyl dicarboxylic acid, 4,4'-diphenyl ether dicarboxylic acid, 4,4'-diphenyl ketone dicarboxylic acid, 3,3'-diphenyl ketone dicarboxylic acid, 4,4'-diphenyl thioether dicarboxylic acid and 4,4'-diphenyl sulfone dicarboxylic acid and the derivatives thereof; the dichlorides of alicyclic carboxylic acids such as cyclohexane dicarboxylic acid and cyclopentane dicarboxylic acid and the derivatives thereof; the dichlorides of saturated aliphatic carboxylic acids such as succinic acid, adipic acid, azelaic acid and sebacic acid; and the dichlorides of unsaturated aliphatic carboxylic acids such as maleic acid, fumaric acid, citraconic acid, itaconic acid and dimer acid are exemplified.

(6) The carbonate precursors used in the present invention are those which produce a polycarbonate by reacting with a bisphenol compound, and polycarbonate oligomers. For example, phosgene, bischloroformates of bisphenol A and hydroquinone, and the oligomers thereof, and bischloroformates of ethylene glycol and neopentyl glycol are exemplified. Among these, phosgene, bischloroformates of bisphenol, and the oligomers thereof are preferable.

(7) The bisphenol compounds containing no azo group which are used in the present invention are represented by the following general formula (XI):

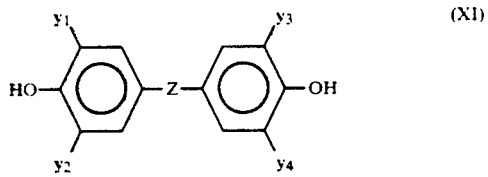

wherein Z represents

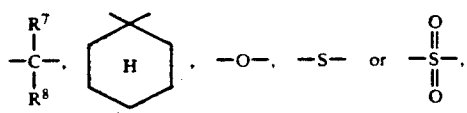

wherein $R^7$ and $R^8$ each represent a hydrogen atom or a hydrocarbon group having 1 to 6 carbon atoms; $y_1$, $y_2$, $y_3$ and $y_4$ each represents a hydrogen atom, a halogen atom, or an aliphatic hydrocarbon group having 1 to 6 carbon atom.

Examples of the bisphenol compounds usable in the present invention are
bis-(4-hydroxyphenyl)methane,
1,1-bis-(4-hydroxyphenyl)ethane,
1,1-bis-(4-hydroxyphenyl)propane,
2,2-bis-(4-hydroxyphenyl)propane (i.e., bisphenol A),
2,2-bis-(4-hydroxyphenyl)butane,
2,2-bis-(4-hydroxyphenyl)pentane,
2,2-bis-(4-hydroxyphenyl)-3-methylbutane,
2,2-bis-(4-hydroxyphenyl)hexane,
2,2-bis-(4-hydroxyphenyl)-4-methylpentane,
1,1-bis-(4-hydroxyphenyl)phenylmethane,
1,1-bis-(4-hydroxyphenyl)cyclopentane,
1,1-bis-(4-hydroxyphenyl)cyclohexane,
2,2-bis-(4-hydroxy-3-chlorophenyl)propane,
2,2-bis-(4-hydroxy-3,5-dimethylphenyl)propane,
4,4-dihydroxydiphenyl ether,
4,4-dihydroxydiphenyl sulfone and
4,4-dihydroxydiphenyl sulfide.

A bisphenol compound is necessary when the carbonate precursor is phosgene or the like, but when the precursor is a polycarbonate oligomer, a bisphenol compound can be dispensed with.

(8) The diol having no azo group which is used in the present invention is an aliphatic, alicyclic or aromatic diol compound. Examples thereof are low-molecular aliphatic diols such as ethylene glycol, propylene glycol, diethylene glycol, butylene glycol, 1,6-hexane diol, neopentyl glycol, 2,3-dimethyl-1,3-propanediol and 1,4-cyclohexanedimethanol; high-molecular aliphatic diols such as polyethylene glycol, polypropylene glycol, polycaprolactonediol, polyvalerolactonediol, and a polyester diol obtained by the polycondensation of the above-described aliphatic carboxylic acid with a low-molecular aliphatic diol; alicyclic diols such as 1,4-cyclohexanediol and 1,3-cyclohexanediol; and diphenol compounds such as bisphenol A, hydroquinone, resorcin, 1,4-diphenyl dihydroxide, and 2,7-naphthalene dihydroxide, 1,6-naphthalene dihydroxide, and 1,5-naphthalene dihydroxide.

(9) As the diamine used in the present invention, any aromatic diamine, aliphatic diamine or heterocyclic diamine is usable. Examples thereof are metaphenylenediamine, paraphenylenediamine, 4,4'-diaminodiphenyl propane, 4,4'-diaminodiphenyl methane, benzidine, 4,4'-diaminodiphenyl sulfide, 4,4'-diaminodiphenyl sulfone, 3,3'-diaminodiphenyl sulfone, 4,4'-diaminodiphenyl ether, 2,6-diaminopyridine, bis-(4-aminophenyl)diethylsilane, bis-(4-aminophenyl)phosphine oxide, bis-(4-aminophenyl)-N-methylamine, 1,5-diaminonaphthalene, 3,3'-dimethyl-benzidine, 3,3'-dimethoxy-benzidine, 2,4-bis-($\beta$-amino-t-butyl)toluene, bis-(para-$\beta$-amino-t-butylphenyl)ether, para-bis(2-methyl-4-aminobenzil)-benzene, para-bis(1,1-dimethyl-5-aminobenzil)benzene, m-xylylenediamine, p-xylylenediamine, bis(para-aminocyclohexyl)methane, hexamethylenediamine, heptamethylenediamine, octamethylenediamine, nonamethylenediamine, decamethylenediamine, 3-methylheptamethylenediamine, 4,4'-dimethyl-heptamethylenediamine, 2,1,1-diaminododecane, 1,2-bis-(3-aminopropoxy)-ethane, 2,2-dimethylpropylenediamine, 3-methoxy-hexamethylenediamine, 2,5-dimethyl hexamethylenediamine, 2,5-dimethylheptamethylenediamine, 5-methylnonamethylenediamine, 1,4-diaminocyclohexane, 1,1,2-diaminooctadecane, and 2,5-diamino-1,3,4-oxadiazol. These diamines are used either singly or in the form of a mixture.

Diimines such as piperazine, 2,5-dimethylpiperazine and 2,5-diethylpiperazine are also usable.

The process according to the present invention is largely separated into the following four methods.

(i) A method of producing an azo group-containinng polymer having an azo group in the main molecular chain comprises polycondensing a compound having an azo group in the main molecular chain and an alcoholic hydroxyl group at both ends thereof, namely, an azobisalcohol with a dicarboxylic acid chloride, and, if necessary, a diol compound having no azo group and/or a diamine compound having no azo group.

(ii) A method of producing an azo-group-containing polymer having an azo group in the main molecular chain comprises polycondensing a compound having an azo group in the main molecular chain and a phenolic hydroxyl group, imino group or amino group at both ends thereof with a dicarboxylic acid chloride, and, if necessary, a diamine compound having no azo group and/or a diol compound having no azo group.

(iii) A method of producing an azo group-containing polymer having an azo group in the main molecular chain comprises polycondensing a compound having an azo group in the main molecular chain and a phenolic hydroxyl group, imino group or amino group at both ends thereof with a carbonate precursor, and, if necessary, a bisphenol compound having no azo group.

(iv) A method of producing an azo group-containing polymer having an azo group in the main molecular chain comprises reacting a compound having an azo group in the main molecular chain and an alcoholic hydroxyl group at both ends thereof with a dicarboxylic acid chloride, and, if necessary, a bisphenol compound having no azo group, and subjecting the thus obtained product and a carbonate precursor and, if necessary, a bisphenol compound having no azo group to interfacial polymerization.

In the methods (i) and (ii), the ratio of the amounts of azobisalcohol, azobisphenol, azobisimine, or azobisamine and as occasion demands, diol having no azo group and/or diamine having no azo group, and dicarboxylic acid chloride is generally determined so that the ratio of a hydroxyl group, imino group and amino group to acid chloride group is substantially an equivalent. The azo group-containing compound such as azobisalcohol, azobisphenol, azobisimine and azobisamine may be either singly polycondensed with dicarboxylic acid chloride in an equivalent, or polycondensed in combination with diol having no azo group and/or diamine having no azo group. In this case, it is preferable that the amount of azo group-containing compound is not less than 0.05 mol % of diol having no azo group and/or diamine having no azo group. If it is less than 0.05 mol %, the obtained product is unsuitable for an azo group-containing polymer. In other words, the ability of the azo group-containing polymer as the radical polymerization initiator is lowered.

In the methods (i) and (ii), polycondensation is generally carried out by solution polymerization or interfacial polymerization in an aprotic organic solvent. As the aprotic organic solvent, toluene, acetone, acetonitrile, ethyl acetate, carbon tetrachloride, methylene chloride, 1,2-dichloroethane, N-methyl-2-pyrrolidone, pyridine, etc. may be exemplified. A dehydrochlorinating agent such as triethylamine and morpholine is also used, if necessary. Such solution polymerization and interfacial polymerization are described in detail in P.W. Morgan; "Condensation Polymers by Interfacial and Solution Methods", (1965), Interscience. In both solution polycondensation and interfacial polycondensation, the reaction is carried out at a comparatively low temperature which does not decompose the azo group. The reaction temperature is generally $-10°$ to $40°$ C., preferably $0°$ to $30°$ C.

The polycondensation in the method (iii) is carried out by interfacial polymerization or a pyridine process.

In interfacial polycondensation, an inorganic base such as an aqueous caustic soda solution, a non-water-soluble organic solvent such as methylene chloride, bisphenol, azobisimine, azobisamine or azobisphenol, a carbonate precursor, and, if necessary, a catalyst and a molecular weight modifier are used.

As the catalyst, any of the known catalysts that accelerate polycarbonate reaction is usable. For example, a tertiary amine such as triethylamine, quaternary ammonium salt and quaternary phosphonium salt may be exemplified, but the catalysts are not restricted thereto.

As the molecular-weight modifier, any of the known compounds that adjust the molecular weight of a polycarbonate by a chain termination mechanism is usable. These compounds are phenol, chlorophenol, p-tert-butylphenol, etc., but they are not restricted thereto.

In a pyridine process, an organic base such as pyridine, a non-watersoluble solvent such as methylene chloride, bisphenol, azobisimine, azobisamine or azobisphenol, a carbonate precursor, and, if necessary, a molecular weight modifier are used.

In the method (iii), it is preferable that the amount of azobisimine, azobisphenol or azobisamine is not less than 0.05 mol % of the bisphenol unit in the polymer. If it is less than 0.05 mol %, the obtained product is unsuitable for an azo group-containing polymer. In other words, the ability of the azo group-containing polymer as the radical polymerization initiator is lowered. Polymerization is carried out at a comparatively low temperature which does not decompose the azo group in both interfacial polymerization and a pyridine process. The reaction temperature is generally $-10°$ to $40°$ C., preferably $0°$ to $30°$ C.

In the method (iv), azobisalcohol is reacted with dicarboxylic acid chloride prior to the interfacial polymerization. This reaction is preferably carried out in an aprotic organic solvent which does not generally react with a reactant.

As examples of such a solvent, N,N-dimethylformamide, N,N-dimethylacetoamide, N,N-diethylacetoamide, N,N-dimethylmethoxyacetoamide, N-methylcaprolactam, dimethyl sulfoxide, N-methyl-2-pyrrolidone, tetramethylurea, tetramethylthiourea, pyridine, dimethyl sulfone, hexamethylphosphor amide, tetramethylene sulfone, formamide, N-methylformamide, butyrolactone, and N-acetyl-2-pyrrolidone may be exemplified, but the solvent is not restricted thereto. The solvent may be used singly or in combination with another solvent or a poor solvent such as benzene, benzonitrile, dioxane, xylene, toluene and cyclohexane.

Reaction with a carbonate precursor in the method (iv) is carried out by interfacial polymerization. In interfacial polymerization, an aqueous caustic soda solution, a non water-soluble organic solvent such as methylene chloride, bisphenol, azobisalcohol, a carbonate precursor, and, if necessary, a catalyst and a molecular-weight modifier are used.

As the catalyst, any of the known catalysts that accelerate polycarbonate reaction is usable. For example, a tertiary amine such as triethylamine, quaternary ammonium salt and quaternary phosphonium salt may be exemplified, but the catalysts are not restricted thereto.

As the molecular-weight modifier, any of the known compounds that adjust the molecular weight of a polycarbonate by a chain termination mechanism is usable. These compounds are phenol, chlorophenol, p-tert-butylphenol, etc., but the molecular-weight modifier is not restricted thereto.

It is preferable that the amount of azobisalcohol used in the method (iv) is not less than 0.05 mol % of the bisphenol unit in the polymer. If it is less than 0.05 mol %, the product is unsuitable for an azo group-containing polymer. In other words, the ability of the azo group-containing polymer as the radical polymerization initiator is lowered. It is preferable that the ratio of dicarboxylic acid chloride used for reacting with azobisalcohol in advance is 1.1 mol to 10 mol, preferably 2 mol to 5 mol based on 1 mol of azobisalcohol. If it is less than 1.1 mol, polycondensation of azobisalcohol with a dicarboxylic acid chloride proceeds, whereby it is difficult to introduce the azo group in the polycarbonate at random. In addition, an alcoholic OH group occupies the ends of the molecule of the reaction product, thereby nullifying the effect of reacting azobisalcohol with a dicarboxylic acid in advance. On the other hand, if it is more than 10 mol, the properties of the polycarbonate are lost.

When azobisalcohol is reacted with a dicarboxylic acid chloride in advance, a bisphenol compound having no azo group may be used together therewith. The amount of bisphenol compound is not restricted so long as it is in the range which can be adjusted at the time of producing a polycarbonate, but it is preferable that the molar number of the bisphenol compound used is not less than the difference in the molar number between azobisalcohol and dicarboxylic acid chloride.

The reaction in the method (iv) is carried out at a relatively low temperature which does not decompose the azo group in both interfacial polymerization and the preliminary reaction. The reaction temperature is generally −10° to 40° C., preferably 0° to 30° C.

According to a process of the present invention, it is possible to produce an azo group-containing polymer having an azo group in the main molecular chain easily and with a good yield. An azo group-containing polymer obtained in this way is useful as a polymerization initiator for producing various block copolymers.

The present invention will be explained in detail with reference to the following non-limitative examples.

EXAMPLE 1

Into a 300 ml four-necked flask, 8.98 g (30.72 mmol) of 1,3-bis(4-aminophenoxy)benzene, 0.48 g (1.67 mmol) of 2,2'-azobis[2-methyl-N-(2-hydroxyethyl)propionamide] and 75 g of N-methyl-2-pyrrolidone (hereinunder referred to as "NMP") were charged to form a uniform solution. After the flask was cooled with ice, 6.58 g (32.41 mmol) of isophthalic acid chloride was added to the resultant mixture in one portion under stirring while passing nitrogen gas into the flask, thereby effecting polycondensation. Several minutes after the addition of isophthalic acid chloride, the reaction solution became viscous. After 30-minute polymerization under ice cooling, the polymerization was continued for 5 hours at room temperature. After the completion of polymerization, the reaction solution was dropped in a large amount of water. The polymer was separated out, washed with methanol several times, and thereafter dried at room temperature for 24 hours in vacuo, thereby obtaining a polymer in the form of a white powder. The yield was 96%.

The $\eta_{inh}$ (in 0.5 wt % NMP, at 30° C.) of the thus-obtained polymer was 0.56 dl/g. The results of the elementary analysis are as follows:

|  | C | H | N |
|---|---|---|---|
| Measured value | 73.49 | 4.21 | 6.98 |
| Calculated value | 73.54 | 4.18 | 7.01 |

In differential thermal analysis, a broad exothermic peak was observed in a temperature range of 130° to 160° C., which agreed with that of the raw material 2,2'-azobis[2-methyl-N-(2-hydroxyethyl)propionamide].

EXAMPLE 2

Into a 300 ml four-necked flask, 5.6 g (27.972 mmol) of 3,4'-diaminodiphenyl ether, 0.11 g (0.318 mmol) of 2,2'-azobis(2-cyanopropanol) and 20 g of NMP were charged to form a uniform solution. After the flask was cooled with ice, 5.744 g (28.29 mmol) of isophthalic acid chloride was added to the resultant mixture in one portion under stirring while passing nitrogen gas into the flask. Several minutes after the addition of isophthalic acid chloride, the reaction solution became viscous. After 30-minute polymerization under ice cooling, the polymerization was continued for 3 hours at room temperature. After the completion of polymerization, the reaction solution was dropped in a large amount of water. The polymer was separated out, washed with methanol several times, and thereafter dried at room temperature for 24 hours in vacuo, thereby obtaining a polymer in the form of a white powder. The yield was 98%.

The $\eta_{inh}$ (in 0.5 wt % NMP, at 30° C.) of the thus-obtained polymer was 0.64 dl/g. In differential thermal analysis, a broad exothermic peak was observed in a temperature range of 120° to 140° C. In the differential thermal analysis of the raw material 2,2'-azobis(2cyanopropanol), a similar exothermic peak was observed and it was rapidly decomposed.

EXAMPLE 3

Into a 300 ml four-necked flask, 5.2841 g (23.15 mmol) of bisphenol A, 0.1442 g (0.500 mmol) of 2,2'-azobis[2-methyl-N-(2-hydroxyethyl)propionamide], 4.3838 g (23.65 mmol) of tributylamine and 63 g of cyclohexane were charged to form a uniform solution. After the flask was cooled with ice, 2.8809 g (14.19 mmol) of isophthalic acid chloride and 1.9206 g (9.46 mmol) of terephthalic acid chloride were added to the resultant mixture in one portion under stirring while passing nitrogen gas into the flask, thereby effecting polycondensation. Several minutes after, the reaction system became cloudy and viscous. After 30-minute polymerization under ice cooling, the polymerization was continued for 5 hours at room temperature. After the completion of polymerization, 150 g of NMP was added to the reaction solution, and the resultant solution was dropped in a large amount of water. The polymer was separated out, washed with methanol several times, and thereafter dried at room temperature for 24 hours in vacuo, thereby obtaining a polymer in the form of a white powder. The yield was 95%.

The $\eta_{inh}$ (in 0.5 wt % 1,1,2,2-tetrachloroethane/phenol, at 30° C.) of the thus-obtained polymer was 0.29 dl/g. The results of the elementary analysis are as follows:

|  | C | H | N |
| --- | --- | --- | --- |
| Measured value | 76.44 | 5.13 | 0.30 |
| Calculated value | 76.60 | 5.09 | 0.32 |

In differential thermal analysis, a broad exothermic peak was observed in a temperature range of 130° to 160° C.

EXAMPLE 4

Into a 300 ml four-necked flask, 5.2 g (32.447 mmol) of 3,3-dimethylolheptane, 0.1273 g (0.6489 mmol) of 2,2'-azobis(2-cyanopropanol), 6.135 g (33.096 mmol) of tributylamine and 46 g of acetophenone were charged to form a uniform solution.

After the flask was cooled with ice, 6.0576 g (33.096 mmol) of adipic acid chloride was added to the resultant mixture in one portion under stirring while passing nitrogen gas into the flask. Several minutes after, the reaction system became cloudy and viscous. After 30-minute polymerization under ice cooling, the polymerization was continued for 5 hours at room temperature. After the completion of polymerization, 150 g of dimethylformamide was added to the reaction solution, and the resultant solution was dropped in a large amount of water. The polymer was separated out, washed with methanol several times, and thereafter dried at room temperature for 24 hours in vacuo, thereby obtaining a polymer in the form of a white powder. The yield was 94%.

The $\eta_{inh}$ (in 0.5 wt % 1,1,2,2,-tetrachloroethane/-phenol, at 30° C.) of the thus-obtained polymer was 0.34 dl/g. In differential thermal analysis, a broad exothermic peak was observed in a temperature range of 120° to 140° C.

REFERENCE EXAMPLE 1

Into a 300 ml four-necked flask, 2.3291 g of the azo group-containing polyamide obtained in Example 1, 37 g of NMP and 6.954 g of styrene were charged and subjected to nitrogen substitution under stirring. Thereafter, the mixture was polymerized at 75° C. for 5 hours, and then at 130° C. for 1 hour. After the polymerization solution was dropped in a large amount of methanol (MeOH), it was washed with MeOH several times, and thereafter dried at 100° C. for 24 hours in vacuo, thereby obtaining a polymer in the form of a white powder. The rate of polymerization of styrene was 49.9%, and the $\eta_{inh}$ (in 0.5 wt % NMP, at 30° C.) of the polymer was 0.45 dl/g. The homopolymer of styrene was extracted by a Soxhlet apparatus by using cyclohexane as the extraction solvent. From the IR spectrum and 'H-NMR of the residual polymer, it was observed that styrene units and amide bonds existed and the polymer was a block copolymer. The rate of block copolymerized styrene to all the polymerized styrene was 51.8%. On the other hand, the rate of polymerization of styrene was 9% in the experiment of polymerization without using the azo group-containing polyamide (i.e., thermal polymerization).

EXAMPLE 5

Into a 300 ml four-necked flask, 2.0 g (10.19 mmol) of 2,2'-azobis(2-cyanopropanol) and 10 g of dried NMP were charged to form a uniform solution. 2.069 g (10.19 mmol) of isophthalic acid chloride was added to the resultant mixture in three times for carrying out a reaction under stirring at room temperature for 5 hours. After the completion of reaction, the reaction solution was dropped in a large amount of water. The polymer was separated out, washed with methanol several times, and thereafter dried at room temperature for 24 hours in vacuo, thereby obtaining a polymer in the form of a white powder. The yield was 86%.

The $\eta_{inh}$ (in 0.5 wt % NMP, at 30° C.) of the thus-obtained polymer was 0.18 dl/g. In differential thermal analysis, a comparatively sharp exothermic peak was observed in a temperature range of 120° to 140° C.

REFERENCE EXAMPLE 2

Into a 300 ml four-necked flask, 2.0 g of the azo group-containing polymer obtained in Example 5, 30 g of NMP and 50 g of butyl acrylate were charged and subjected to nitrogen substitution under stirring. Thereafter, the mixture was polymerized at 70° C. for 4 hours. After the polymerization solution was dropped in a large amount of MeOH, it was washed with MeOH several times, and thereafter dried at 100° C. for 24 hours in vacuo, thereby obtaining a transparent rubber polymer. The rate of polymerization of butyl acrylate was 38%. In differential thermal analysis, a broad exothermic peak was observed in a temperature range of 120° to 140° C.

10 g of the thus-obtained rubber polymer, 10 g of NMP and 20 g of styrene were mixed and polymerized at 70° C. for 4 hours, and then at 130° C. for 1 hour in the above-described way, thereby obtaining a polymer in the form of a white powder. The rate of polymerization of styrene was 47%. In differential thermal analysis, no exothermic peak was observed.

EXAMPLE 6

Into a 300 ml four-necked flask, 5.2840 g (23.15 mmol) of bisphenol A, 0.2277 g (0.500 mmol) of 2,2'-azobis[N-(4-hydroxyphenyl)-2-methylpropionamidine] dihydrochloride and 60 g of N-methyl-2-pyrrolidone (NMP) were charged to form a uniform solution. After the flask was cooled with ice, 2.8810 g (14.19 mmol) of isophthalic acid chloride and 1.9210 g (9.46 mmol) of terephthalic acid chloride were added to the resultant mixture in one portion under stirring while passing nitrogen gas into the flask, thereby effecting polycondensation. After the completion of polymerization, the reaction solution was dropped in a large amount of water. The polymer was separated out, washed with methanol several times, and thereafter dried at room temperature for 24 hours in vacuo, thereby obtaining a polymer in the form of a white powder. The yield was 94%. The $\eta_{inh}$ (in 0.5 wt % 1,1,2,2-tetrachloroethane/-phenol, at 30° C.) of the thus-obtained polymer was 0.41 dl/g. In differential thermal analysis, a broad exothermic peak was observed in a temperature range of 80° to 150° C. When the polymer was heated to 130° C. for 5 hours, no exothermic peak was observed in the above temperature range.

EXAMPLE 7

Into a 500 ml three-necked flask, 4.012 g (19.7615 mmol) of isophthalic acid chloride and 200 g of methylene chloride were charged to form a uniform solution. Separately from this, an aqueous solution was composed of 4.4229 g (19.374 mmol) of bisphenol A, 0.1765 g (0.387 mmol) of 2,2'-azobis[N-(3-hydroxyphenyl)-2-methylpropionamidine] dihydrochloride, 1.739 g of caustic soda, 0.19 g of trioctylmethylammonium chloride and 160 g of desalted water. The thus-obtained aqueous solution was added to the above methylene chloride solution in one portion, and the resultant mixture was stirred at a high speed at room temperature, thereby effecting interfacial polymerization. One hour after, the reaction solution was dropped in a large amount of acetone. The polymer was separated out, washed with water and methanol several times, and thereafter dried at room temperature for 24 hours in vacuo, thereby obtaining a polymer in the form of a white powder. The yield was 90.8%. The $\eta_{inh}$ (in 0.5 wt % 1,1,2,2-tetrachloroethane/phenol, at 30° C.) of the thus-obtained polymer was 0.84 dl/g. In differential thermal analysis, a broad exothermic peak was observed in a temperature range of 80° to 150° C. When the polymer was heated to 130° C. for 5 hours, no exothermic peak was observed in the above temperature range.

EXAMPLE 8

Into a 300 ml four-necked flask, 8.99 g (30.75 mmol) of 1,3-bis (4-aminophenoxy)benzene, 0.642 g (1.67 mmol) of 2,2'-azobis[N-(4-hydroxyphenyl)-2-methylpropionamide] and 75 g of NMP were charged to form a uniform solution. Thereafter, 6.58 g (32.410 mmol) of isophthalic acid chloride was added to the resultant mixture in one portion under stirring for effecting polymerization at room temperature for 5 hours. After the completion of polymerization, the reaction solution was dropped in a large amount of water. The polymer was separated out, washed with methanol several times, and thereafter dried at room temperature for 24 hours in vacuo, thereby obtaining a polymer in the form of a white powder. The yield was 95%.

The $\eta_{inh}$ (in 0.5 wt % NMP, at 30° C.) of the thus-obtained polymer was 0.76 dl/g. In differential thermal analysis, an exothermic peak was observed in a temperature range of 110° to 150° C. When the polymer was heated to 130° C. for 5 hours, no exothermic peak was observed in the above temperature range.

EXAMPLE 9

Into a 300 ml three-necked flask, 2.03 g (10 mmol) of isophthalic acid chloride and 100 g of methylene chloride were charged to form a uniform solution. Separately from this, an aqueous solution was composed of 4.554 g (10 mmol) of 2,2'-azobis[N-(3-hydroxyphenyl)-2-methylpropionamidine] dihydrochloride, 1.7 g of caustic soda, 0.1 g of trioctylmethylammonium chloride and 80 g of desalted water. The thus-obtained aqueous solution was added to the above methylene chloride solution at a time, and the resultant mixture was stirred at a high speed at room temperature, thereby effecting polymerization. One hour after, the reaction solution was dropped in a large amount of acetone. The polymer was separated out, washed with water and methanol several times, and thereafter dried at room temperature for 24 hours in vacuo, thereby obtaining a polymer in the form of a white powder. The yield was 92%. The $\eta_{inh}$ (in 0.5 wt % 1,1,2,2-tetrachloroethane/phenol, at 30° C.) of the thus-obtained polymer was 0.77 dl/g.

EXAMPLE 10

Into a 300 ml four-necked flask, 5.2507 g (23.0 mmol) of bisphenol A, 0.1617 g (0.500 mmol) of 2,2'-azobis(N,N'-dimethyleneisobutylamidine)dihydrochloride, and 60 g of NMP were charged to form a uniform solution. After the flask was cooled with ice, 2.8504 g (14.04 mmol) of isophthalic acid chloride and 1.9210 g (9.46 mmol) of terephthalic acid chloride were added to the resultant mixture in one portion under stirring while passing nitrogen gas into the flask, thereby effecting polycondensation.

By the same treatment as in Example 6, a polymer in the form of a white powder was obtained. The yield was 92.0%. The $\eta_{inh}$ (in 0.5 wt % 1,1,2,2-tetrachloroethane/phenol, at 30° C.) of the thus-obtained polymer was 0.35 dl/g. In differential thermal analysis, a broad exothermic peak was observed in a temperature range of 80° to 150° C. When the polymer was heated to 130° C. for 5 hours, no exothermic peak was observed in the above temperature range.

EXAMPLE 11

Into a 500 ml three-necked flask, 4.020 g (19.8 mmol) of isophthalic acid chloride and 200 g of methylene chloride were charged to form a uniform solution. Separately from this, an aqueous solution was composed of 4.430 g (19.405 mmol) of bisphenol A, 0.1388 g (0.395 mmol) of 2,2'-azobis[2-(3,4,5,6-tetrahydropyrimidine-2-yl)propane]dihydrochloride, 1.739 g of caustic soda, 0.19 g of trioctylmethylammonium chloride and 160 g of desalted water. The thus-obtained aqueous solution was added to the above methylene chloride solution in one portion, and the mixture was stirred at a high speed at room temperature, thereby effecting interfacial polymerization. One hour after, the reaction solution was dropped in a large amount of acetone to separate out the product. The product was washed with water and methanol several times, and thereafter dried at room temperature for 24 hours in vacuo, thereby obtaining a polymer in the form of a white powder. The yield was 91.2%. The $\eta_{inh}$ (in 0.5 wt % 1,1,2,2-tetrachloroethane/phenol, at 30° C.) of the thus-obtained polymer was 0.57 dl/g. In differential thermal analysis, a broad exothermic peak was observed in a temperature range of 80° to 150° C. When the polymer was heated to 130° C. for 5 hours, no exothermic peak was observed in the above temperature range.

EXAMPLE 12

Into a 300 ml four-necked flask, 9.00 g (30.785 mmol) of 1,3-bis (4-aminophenoxy)benzene, 0.5972 g (1.7 mmol) of 2,2'-azobis[N-(5-methyl-imidazoline-2-yl)propane]dihydro chloride and 75 g of NMP were charged to form a uniform solution. Thereafter, 6.595 g (32.485 mmol) of isophthalic acid chloride was added to the resultant mixture in one portion under stirring for effecting polymerization at room temperature for 5 hours. After the completion of polymerization, the reaction solution was dropped in a large amount of water. The polymer was separated out, washed with methanol several times, and thereafter dried at room temperature for 24 hours in vacuo, thereby obtaining a polymer in the form of a white powder. The yield was 96.2%. The $\eta_{inh}$ (in 0.5 wt % NMP, at 30° C.) of the thus-obtained polymer was 0.68 dl/g. In differential thermal analysis, an exothermic peak was observed in a temperature range of 80° to 150° C. When the polymer was heated to 130° C. for 5 hours, no exothermic peak was observed in the above temperature range.

EXAMPLE 13

Into a 300 ml three-necked flask, 2.03 g (10 mmol) of isophthalic acid chloride and 100 g of methylene chloride were charged to form a uniform solution. Separately from this, an aqueous solution was composed of 2.504 g (10 mmol) of 2,2'-azobis(N,N'-dimethyleneisobutylamidine), 1.7 g of caustic soda, 0.1 g of trioctylmethylammonium chloride and 80 g of desalted water. The thus-obtained aqueous solution was added to the above methylene chloride solution in one portion, and the resultant mixture was stirred at a high speed at room temperature, thereby effecting interfacial polymerization. One hour after, the reaction solution was dropped in a large amount of acetone. The polymer was separated out, washed with water and methanol several times, and thereafter dried at room temperature for 24 hours in vacuo, thereby obtaining a polymer in the form of a white powder. The yield was 90.5%. The $\eta_{inh}$ (in 0.5 wt % 1,1,2,2-tetrachloroethane/phenol, at 30° C.) of the thus-obtained polymer was 0.34 dl/g.

EXAMPLE 14

Into a 300 ml three-necked flask, 2.03 g (10. mmol) of isophthalic acid chloride and 100 g of methylene chloride were charged to form a uniform solution. Separately from this, an aqueous solution was composed of 5.26 g (10 mmol) of 2,2'-azobis[N'-(4-aminophenyl)-2-methylpropionamidine]tetrahydrochloride, 3.3 g of caustic soda, 0.06 g of triethylbenzilammonium chloride and 80 g of desalted water. The thus-obtained aqueous solution was added to the above methylene chloride solution in one portion, and the resultant mixture was stirred at a high speed at room temperature, thereby effecting polymerization. On hour after, the reaction solution was dropped in a large amount of acetone. The polymer was separated out, washed with water and methanol several times, and thereafter dried at room temperature for 24 hours in vacuo, thereby obtaining a polymer in the form of a white powder. The yield was 93%. The $\eta_{inh}$ (in 0.5 wt % NMP, at 30° C.) of the thus-obtained polymer was 1.2 dl/g. From the IR spectrum absorption based on the amide group was observed at 3,300 cm$^{-1}$ and 1680 cm$^{-1}$.

EXAMPLE 15

Into a 300 ml four-necked flask, 9.00 g (30.785 mmol) of 1,3-bis (4-aminophenoxy)benzene, 0.647 g (1.7 mmol) of 2,2'-azobis[N-(4-aminophenyl)-2-methylpropionamidine] and 75 g of NMP were charged to form a uniform solution. Thereafter, 6.595 g (32.485 mmol) of isophthalic acid chloride was added to the mixture in one portion under stirring for effecting polymerization at room temperature for 5 hours. After the completion of polymerization, the reaction solution was dropped in a large amount of water. The polymer was separated out, washed with methanol several times, and thereafter dried at room temperature for 24 hours in vacuo, thereby obtaining a polymer in the form of a white powder. The yield was 97%. The $\eta_{inh}$ (in 0.5 wt % NMP, at 30° C.) of the thus-obtained polymer was 0.87 dl/g. In differential thermal analysis, a broad exothermic peak was observed in a temperature range of 80° to 160° C. When the polymer was heated to 130° C. for 5 hours, no exothermic peak was observed in the above temperature range.

EXAMPLE 16

Into a 300 ml four-necked flask, 2.03 g (10 mmol) of isophthalic acid chloride and 100 g of methylene chloride were charged to form a uniform solution. Separately from this, an aqueous solution was composed of 0.526 g (1 mmol) of 2,2'-azobis[N-(3-aminophenyl)-2-methylpropionamidine]tetrahydrochloride, 1.046 g (9 mmol) of 1,6-hexamethylenediamine, 2.5 g of caustic soda, 0.1 g of trioctylmethylammonium chloride and 80 g of desalted water. The thus-obtained aqueous solution was added to the above methylene chloride solution in one portion, and the resultant mixture was stirred at a high speed at room temperature, thereby effecting polymerization. Two hours after, the reaction solution was dropped in a large amount of acetone. The polymer was separated out, washed with water and methanol several times, and thereafter dried at room temperature for 24 hours in vacuo, thereby obtaining a polymer in the form of a white powder The yield was 92%. The $\eta_{inh}$ (in 0.5 wt % NMP, at 30° C.) of the thus-obtained polymer was 1.3 dl/g. In differential thermal analysis, a broad exothermic peak was observed in a temperature range of 80° to 160° C. When the polymer was heated to 130° C. for 5 hours, no exothermic peak was observed in the above temperature range.

EXAMPLE 17

A polymer in the form of a white powder was produced with a yield of 91% in the same way as in Example 16 except that 1.533 g (9 mmol) of isophoronediamine was used in place of 1,6-hexamethylenediamine. The $\eta_{inh}$ (in 0.5 wt % NMP, at 30° C.) of the thus-obtained polymer was 0.9 dl/g. In differential thermal analysis, a broad exothermic peak was observed in a temperature range of 80° to 160° C. When the polymer was heated to 130° C. for 5 hours, no exothermic peak was observed in the above temperature range.

EXAMPLE 18

Into a 300 ml four-necked flask, 1.83g (10 mmol) of adipic acid chloride and 80 g of methylene chloride were charged to form a uniform solution. Separately from this, an aqueous solution was composed of 0.263 g (0.5 mmol) of 2,2'-azobis[N'-(4-aminophenyl)-2-methylpropionamidine]tetrahydrochloride, 1.618 g (9.5 mmol) of isophoronediamine, 2.0 g of caustic soda, 0.08 g of cetyltrimethylammonium chloride and 80 g of desalted water. The thus-obtained aqueous solution was added to the above methylene chloride solution in one portion for effecting polymerization at room temperature for 2 hours. By the same treatment as in Example 6, a polymer in the form of a white powder was obtained. The yield was 90%. The $\eta_{inh}$ (in 0.5 wt % NMP, at 30° C.) of the thus-obtained polymer was 0.8 dl/g. In differential thermal analysis, a broad exothermic peak was observed in a temperature range of 80° to 160° C.

EXAMPLE 19

Into a 300 ml three-necked flask, 2.39 g (10 mmol) of sebacic acid chloride and 100 g of carbon tetrachloride were charged to form a uniform solution. Separately from this, an aqueous solution was composed of 4.55 g (10 mmol) of 2,2'-azobis[N-(4-aminophenyl)-2-methylpropionamide]dihydrochloride, 1.7 g of caustic soda, 0.08 g of triethylbenzilammonium chloride and 80 g of desalted water. The thus-obtained aqueous solution was added to the above carbon tetrachloride solution in one portion, and the resultant mixture was stirred at a high speed at room temperature, thereby effecting polymerization. Two hours after, the reaction solution was dropped in a large amount of acetone. The polymer was separated out, washed with water and methanol several times, and thereafter dried at room temperature for 24 hours in vacuo, thereby obtaining a polymer in the form of a white powder. The yield was 92%. The $\eta_{inh}$ (in 0.5 wt % NMP, at 30° C.) of the thus-obtained polymer was 1.0 dl/g. From the IR spectrum absorption based on the amide group was observed at 3,300 cm$^{-1}$ and 1680 cm$^{-1}$.

EXAMPLE 20

Into a 500 ml three-necked flask, 4.02 g (19.8 mmol) of isophthalic acid chloride and 200 g of methylene chloride were charged to form a uniform solution. Separately from this, an aqueous solution was composed of 4.430 g (19.405 mmol) of bisphenol A, 0.208 g (0.395 mmol) of 2,2'-azobis[N-(4-aminophenyl)-2-methylpropionamidine]tetrahydrochloride, 1.8 g of caustic soda, 0.19 g of trioctylmethylammonium chloride and 160 g of desalted water. The thus-obtained aqueous solution was added to the above methylene chloride solution in one portion, and the resultant mixture was stirred at a high speed at room temperature, thereby effecting polymerization. One hour after, the reaction solution was dropped in a large amount of acetone. The polymer was separated out, washed with water and methanol several times, and thereafter dried at room temperature for 24 hours in vacuo, thereby obtaining a polymer in the form of a white powder. The yield was 93%. The $\eta_{inh}$ (in 0.5 wt % 1,1,2,2-tetrachloroethane/phenol, at 30° C.) of the thus-obtained polymer was 0.8 dl/g. In differential thermal analysis, a broad exothermic peak was observed in a temperature range of 80° to 160° C. When the polymer was heated to 130° C. for 5 hours, no exothermic peak was observed in the above temperature range.

REFERENCE EXAMPLE 3

Into a 300 ml four-necked flask, 3.0 g of the azo group-containing polyamide obtained in Example 6, 37 g of NMP and 7.0 g of styrene were charged and subjected to nitrogen substitution under stirring. Thereafter, the resultant mixture was polymerized at 75° C. for 5 hours, and then at 130° C. for 1 hour. Afterwards the polymerization solution was dropped in a large amount of methanol to separate out a polymer. The polymer was washed with methanol several times, and thereafter dried at 100° C. for 24 hours in vacuo, thereby obtaining a polymer in the form of a white powder. The rate of polymerization of styrene was 45.7%, and the $\eta_{inh}$ (in 0.5 wt % NMP, at 30° C.) of the polymer was 0.68 dl/g. The homopolymer of styrene was extracted by a Soxhlet apparatus by using cyclohexane as the extraction solvent. From the IR spectrum and $^1$H-NMR of the residual polymer, it was observed that styrene units and amide bonds existed and the polymer was a block copolymer. The rate of block copolymerized styrene to all the polymerized styrene was 58.2%. The rate of polymerization of styrene was 9% in the experiment of polymerization without using the azo group-containing polyamide (i.e., thermal polymerization).

REFERENCE EXAMPLE 4

Into a 300 ml four-necked flask, 2.0 g of the azo group-containing polymer obtained in Example 9, 30 g of NMP and 50 g of butyl acrylate were charged and subjected to nitrogen substitution under stirring. Thereafter, the resultant mixture was polymerized at 70° C. for 4 hours. Afterwards the polymerization solution was dropped in a large amount of methanol to separate out the polymer. The polymer was washed with methanol several times, and thereafter dried at room temperature for 24 hours in vacuo, thereby obtaining a transparent rubber polymer. The rate of polymerization of butyl acrylate was 43.5%.

10 g of the thus-obtained rubber polymer, 10 g of NMP and 20 g of styrene were mixed and polymerized at 70° C. for 4 hours, and then at 130° C. for 1 hour in the above-described way, thereby obtaining a polymer in the form of a white powder. The rate of polymerization of styrene was 46.0%.

REFERENCE EXAMPLE 5

Into a 300 ml four-necked flask, 3.0 g of the azo group-containing polyamide obtained in Example 10, 37 g of NMP and 7.0 g of styrene were charged and subjected to nitrogen substitution under stirring. Thereafter, the resultant mixture was polymerized at 75° C. for 5 hours, and then at 130° C. for 1 hour. Afterwards the polymerization solution was dropped in a large amount of methanol to separate out a polymer. The polymer was washed with methanol several times, and thereafter dried at 100° C. for 24 hours in vacuo, thereby obtaining a polymer in the form of a white powder. The rate of polymerization of styrene was 43.8%, and the $\eta_{inh}$ (in 0.5 wt % NMP, at 30° C.) of the polymer was 0.46 dl/g. The homopolymer of styrene was extracted by a Soxhlet apparatus by using cyclohexane as the extraction solvent. From the IR spectrum and $^1$H-NMR of the residual polymer, it was observed that styrene units and amide bonds existed and the polymer was a block copolymer. The rate of block copolymerized styrene to all the polymerized styrene was 53.5%. The rate of polymerization of styrene was 9% in the experiment of polymerization without using the azo group-containing polyamide (i.e., thermal polymerization).

REFERENCE EXAMPLE 6

Into a 300 ml four-necked flask, 3.0 g of the azo group-containing polymer obtained in Example 13, 30 g of NMP and 50 g of butyl acrylate were charged and subjected to nitrogen substitution under stirring. Thereafter, the resultant mixture was polymerized at 70° C. for 4 hours. Afterwards the polymerization solution was dropped in a large amount of methanol to separate out the polymer. The polymer was washed with methanol several times, and thereafter dried at room temperature for 24 hours in vacuo, thereby obtaining a transparent rubber polymer. The rate of polymerization of butyl acrylate was 50.1%.

10 g of the thus-obtained rubber polymer, 10 g of NMP and 20 g of styrene were mixed and polymerized at 70° C. for 4 hours, and then at 130° C. for 1 hour in the above-described way, thereby obtaining a polymer in the form of a white powder. The rate of polymerization of styrene was 38.9%.

REFERENCE EXAMPLE 7

Into a 300 ml four-necked flask, 3.0 g of the azo group-containing polymer obtained in Example 14, 40 g of NMP and 50 g of butyl acrylate were charged and subjected to nitrogen substitution under stirring. Thereafter, the resultant mixture was polymerized at 70° C. for 4 hours. Afterward the polymerization solution was dropped in a large amount of methanol to separate out the polymer. The polymer was washed with methanol several times, and thereafter dried at room temperature for 24 hours in vacuo, thereby obtaining a rubber polymer. The rate of polymerization of butyl acrylate was 47%.

10 g of the thus-obtained rubber polymer, 10 g of NMP and 20 g of styrene were mixed and polymerized at 70° C. for 44 hours, and then at 130° C. for 1 hour in the above-described way, thereby obtaining a polymer in the form of a white powder. The rate of polymerization of styrene was 44%.

REFERENCE EXAMPLE 8

Into a 300 ml four-necked flask, 5.0 g of the azo group-containing polyamide obtained in Example 15, 50 g of NMP and 10 g of styrene were charged and subjected to nitrogen substitution under stirring. Thereafter, the mixture was polymerized at 75° C. for 5 hours, and then at 130° C. for 1 hour. Afterwards the polymerization solution was dropped in a large amount of methanol to separate out a polymer. The polymer was washed with methanol several times, and thereafter dried at 100° C. for 24 hours in vacuo, thereby obtaining a polymer in the form of a white powder. The rate of polymerization of styrene was 47%.

EXAMPLE 21

(a) Production of oligomer

| Bisphenol A | 100 parts by weight |
|---|---|
| Sodium hydroxide | 37 parts by weight |
| Water | 670 parts by weight |

The mixture of the above components was charged into a reactor equipped with a stirrer, and 360 parts of methylene chloride was added thereto under stirring at a rate of 800 rpm. Thereafter, 54 g of phosgene was blown into the mixture solution in 60 minutes while cooling the solution to not higher than 20° C., thereby producing an oligomer. After the completion of reaction, only the methylene chloride solution containing a polycarbonate oligomer was collected.

The results of analysis of the thus-obtained methylene chloride solution were as follows:

| Concentration of oligomer | 22.9% (note 1) |
|---|---|
| Concentration of chroloformate | 0.50 N (note 2) |
| Concentration of phenolic hydroxyl end group | 0.02 N (note 3) |

(note 1) Measured after the solution was evaporated and dried
(note 2) Neutralization titration of aniline hydrochloride obtained by the reaction with aniline with 0.2 N aqueous solution of sodium hydroxide
(note 3) Colorimetry of the oligomer dissolved in titanium tetrachloride and acetic acid solution at 546 nm.

The thus-obtained oligomer solution is referred to as oligomer solution A hereinafter.

(b) Production of polymer

| Oligomer solution A | 177 ml |
|---|---|
| p-tert-butylphenol | 0.645 g |
| Methylene chloride | 300 ml |

The mixture of the above components was charged into a reactor equipped with a stirrer and stirred at a rate of 600 rpm. The following components were added thereto, thereby effecting interfacial polymerization at room temperature for 3 hours.

| Aqueous 25 wt % caustic soda solution | 24 ml |
|---|---|
| Solution of 1.2933 g of 2,2'- azobis(N,N'-dimethyleneiso- butylamidine)dihydrochloride dissolved in 35 ml of water | |
| Aqueous 2 wt % triethylamine solution | 0.9 ml |
| Water | 83 ml |

After the polymerization solution was separated into a water layer and a methylene chloride layer containing polycarbonate, the methylene chloride layer was subsequently washed with an aqueous sodium hydrate solution, aqueous hydrochloric acid solution, and desalted water. Methylene chloride was poured into a large amount of methanol to separate out a polymer. The polymer was filtered and dried at room temperature for 24 hours in vacuo, thereby obtaining a polymer in the form of a white powder. The yield of the polymer was 95%, and the $\eta_{inh}$ (in 0.5 g/dl methylene chloride, at 30° C.) of the polymer was 0.50 dl/g.

In the differential thermal analysis (DSC) of the polymer, a broad exothermic peak was observed in a temperature range of 90° to 150° C. When the polymer was heated to 130° C. for 5 hours, no exothermic peak was observed in the above temperature range. In the ultraviolet spectrum (UV) of the chloroform solution of the polymer, the maximum absorption was observed at 350 nm. In the polycarbonate obtained by polymerization without using 2,2'-azobis (N,N'-dimethyleneisobutylamidine)dihydrochloride, the exothermic peak in the DSC nor the maximum absorption at 350 nm in the UV was not observed. In the DSC and UV of 2,2'-azobis(N,N'-dimethyleneisobutylamidine)-dihydrochloride, the exothermic peak was observed in the above temperature range and the maximum absorption was observed at 350 nm.

EXAMPLE 22

| Oligomer solution A | 177 ml |
|---|---|
| p-tert-butylphenol | 0.65 g |
| Methylene chloride | 60 ml |

The mixture of the above components was charged into a reactor equipped with a stirrer and stirred at a rate of 600 rpm. The following components were added thereto, and stirred for 30 minutes.

| Aqueous 2 wt % trimethylamine solution | 0.9 ml |
|---|---|
| Solution of 1.972 g of 2,2'- azobis(N-4-hydroxyphenyl)2- methylpropioneamidine) dihydrochloride dissolved in 86 g of water | |
| Aqueous 25 wt % caustic soda solution | 24 ml |

Thereafter, 700 ml of methylene chloride was added thereto, thereby effecting polymerization at room temperature for 2.5 hours. The same treatment as that in Example 21 was applied to the polymerization solution to obtain a polymer in the form of a white powder.

The yield of the polymer was 97%, and the $\eta_{inh}$ (in 0.5 g/dl methylene chloride, at 30° C.) was 0.45 dl/g. In DSC, a broad exothermic peak was observed in a temperature range of 60° to 170° C. and in UV, the maximum absorption was observed at 350 nm. By the determination of the azo group by UV, it was observed that the polymer contained the azo groups approximately in the same state as the start.

EXAMPLE 23

| Oligomer solution A | 177 ml |
|---|---|
| p-tert-butylphenol | 0.65 g |
| Methylene chloride | 60 ml |

The mixture of the above components was charged into a reactor equipped with a stirrer and stirred at a rate of 600 rpm. The following components were added thereto, and stirred for 30 minutes.

| Aqueous 2 wt % trimethylamine solution | 0.9 ml |
|---|---|
| Solution of 1.089 g of 2,2'-azobis (2-methylpropioneamidine) dihydrochloride dissolved in 80 g of water | |
| Aqueous 25 wt % caustic soda solution | 24 ml |

Thereafter, 700 ml of methylene chloride was added thereto, thereby effecting polymerization at room temperature for 2.5 hours. The same treatment as that in Example 21 was applied to the polymerization solution to obtain a polymer in the form of a white powder.

The yield of the polymer was 95%, and the $\eta_{inh}$ (in 0.5 g/dl methylene chloride, at 30° C.) was 0.43 dl/g. In DSC, a broad exothermic peak was observed in a temperature range of 80° to 160° C. and in UV, the maximum absorption was observed at 350 nm.

When the polymer was heated to 130° C. for 5 hours, the exothermic peak in the DSC and the maximum absorption at 350 nm in the UV had disappeared.

EXAMPLE 24

| Oligomer solution A | 177 ml |
|---|---|
| p-tert-butylphenol | 0.645 g |
| methylene chloride | 800 ml |

The mixture of the above components was charged into a reactor equipped with a stirrer and stirred at a rate of 600 rpm. The following components were added thereto, thereby effecting polymerization at room temperature for 3 hours.

| Aqueous 2 wt % trimethylamine solution | 0.9 ml |
|---|---|
| Solution of 2.11 g of 2,2'-azobis[N-(4-aminophenyl)-2-methylpropioneamidine]tetrahydrochloride dissolved in 80 ml of water | |
| Aqueous 25 wt % caustic soda solution | 25 ml |

The polymerization was treated in the same way as in Example 21 to obtain a polymer in the form of a white powder.

The yield of the polymer was 96%, and the $\eta_{inh}$ (in 0.5 g/dl methylene chloride, at 30° C.) was 0.52 dl/g. In DSC, a broad exothermic peak was observed in a temperature range of 80° to 160° C. and in UV, the maximum absorption was observed at 350 nm.

EXAMPLE 25

A polymer in the form of a white powder was produced with a yield of 94% in the same way as in Example 21 except that 2.003 g of 2,2'-azobis(N,N'-dimethylisobutylamidine) was used in place of 1.2933 g of 2,2'-azobis(N,N'-dimethylisobutylamidine)dihydrochloride. The $\eta_{inh}$ (in 0.5 g/dl methylene chloride, at 30° C.) of the thus-obtained polymer was 0.51 dl/g. In DSC, a broad exothermic peak was observed in a temperature range of 90° to 150° C. and in UV, the maximum absorption was observed at 350 nm.

EXAMPLE 26

A polymer in the form of a white powder was produced with a yield of 93% in the same way as in Example 24 except that 2.10 g of 2,2'-azobis[N-(3-aminophenyl)-2-methylpropionamidine]tetrahydrochloride was used in place of 2.11 g of 2,2'-azobis[N-(4-aminophenyl)-2-methylpropionamidine]tetrahydrochloride. The $\eta_{inh}$ (in 0.5 g/dl methylene chloride, at 30° C.) of the thus-obtained polymer was 0.46 dl/g. In DSC and in UV, a broad exothermic peak and the maximum absorption, respectively, were observed.

EXAMPLE 27

The same polymerization as that in Example 22 was carried out except that 1.538 g of 2,2'-azobis[N-(4-hydroxyphenyl)-2-methylpropionamidine] was used in place of 1.972 g of 2,2'-azobis[N-(4-hydroxyphenyl)-2-methylpropionamidine]dihydrochloride.

A polymer in the form of a white powder having a $\eta_{inh}$ (in 0.5 g/dl methylene chloride, at 30° C.) of 0.48 dl/g was obtained with a yield of 95%. In DSC, a broad exothermic peak was observed in a temperature range of 90° to 150° C. and in UV, the maximum absorption was observed at 350 nm.

EXAMPLE 28

The same polymerization as that in Example 21 was carried out except that 1.405 g of 2,2'-azobis[2-(3,4,5,6-tetrahydropyrimidine-2-yl-)propane]dihydrochloride was used in place of 1.2933 g of 2,2'-azobis(N,N'-dimethylisobutylamidine) dihydrochloride.

A polymer in the form of a white powder having a $\eta_{inh}$ (in 0.5 g/dl methylene chloride, at 30° C.) of 0.44 dl/g was obtained with a yield of 92%. In DSC, a broad exothermic peak was observed in a temperature range of 90° to 150° C. and in UV, the maximum absorption was observed at 350 nm.

REFERENCE EXAMPLE 9

Into a 300 ml four-necked flask, 3.0 g of the azo group-containing polyamide obtained in Example 21, 37 g of N-methyl-2-pyrrolidone (NMP) and 7.0 g of styrene were charged and subjected to nitrogen substitution under stirring. Thereafter, the resultant mixture was polymerized at 75° C. for 5 hours, and then at 130° C. for 1 hour. Afterwards the polymerization solution was dropped in a large amount of methanol. The polymer was washed with methanol several times, and thereafter dried at 100° C. for 24 hours in vacuo, thereby obtaining a polymer in the form of a white powder.

The rate of polymerization of styrene was 42%, and the $\eta_{inh}$ (in 0.5 wt % NMP, at 30° C.) of the polymer was 0.36 dl/g. The homopolymer of styrene was extracted by a Soxhlet apparatus by using cyclohexane as the extraction solvent. From the IR spectrum and 'H-NMR of the residual polymer, it was observed that styrene units and carbonate bonds existed and the polymer was a block copolymer. The rate of block copolymerized styrene to all the polymerized styrene (blocking efficiency) was 62%. The rate of polymerization of styrene was 9% in the experiment of polymerization without using the azo group-containing polyamide (i.e., thermal polymerization).

REFERENCE EXAMPLE 10

Into a 300 ml four-necked flask, 3.0 g of the azo group-containing polycarbonate obtained in Example 22, 37 g of NMP and 7.0 g of styrene were charged and polymerized and treated thereafter in the same way as in Reference Example 9. The rate of polymerization of styrene was 48%, and the $\eta_{inh}$ (in 0.5 wt % NMP, at 30° C.) was 0.42 dl/g. The blocking efficiency was 61%.

EXAMPLE 29

| <Production of oligomer> | |
|---|---|
| Bisphenol A | 100 parts |
| Sodium hydroxide | 37 parts |
| Water | 670 parts |

The mixture of the above components was charged into a reactor equipped with a stirrer, and 360 parts of methylene chloride was added thereto under stirring at a rate of 800 rpm. Thereafter, 54 g of phosgene was blown into the mixture solution in 60 minutes while cooling the solution to not higher than 20° C., thereby producing an oligomer. After the completion of reaction, only the methylene chloride solution containing a polycarbonate oligomer was collected.

The results of analysis of the thus-obtained methylene chloride solution were as follows:

| | |
|---|---|
| Concentration of oligomer | 22.9% (note 1) |
| Concentration of chroloformate | 0.50 N (note 2) |
| Concentration of phenolic hydroxyl end group | 0.02 N (note 3) |

(note 1) Measured after the solution was evaporated and dried
(note 2) Neutralization titration of aniline hydrochloride obtained by the reaction with aniline with 0.2 N aqueous solution of sodium hydroxide.
(note 3) Colorimetry of the oligomer dissolved in titanium tetrachloride and acetic acid solution at 546 nm.

The thus-obtained oligomer solution will be referred to as oligomer solution A hereinafter.

Preliminary reaction

Into a 100 ml four-necked flask, 1.136 g of 2,2'-azobis[2-methyl-N-(2-hydroxyethyl)propionamide] and 30 g of N-methyl-2-pyrrolidone (NMP) were charged to form a uniform solution.

3.200 g of isophthalic acid chloride was charged into the solution and stirred at room temperature for 30 minutes to effect a reaction.

Production of polymer 177 ml of the oligomer solution A and 31 ml of methylene chloride were charged into a reactor equipped with a stirrer, and stirred at a rate of 600 rpm. To the resultant mixture, 0.9 ml of aqueous 2 wt % trimethylamine solution, 30 ml of the preliminary reaction solution, 30 ml of methylene chloride, 41 ml of water and 31 ml of aqueous 25 wt % caustic solution were added. Further, 500 ml of methylene chloride was added thereto, thereby effecting interfacial polymerization at room temperature for 3 hours.

After the polymerization solution was separated into a water layer and a methylene chloride layer containing polycarbonate, the methylene chloride layer was subsequently washed with an aqueous sodium hydrate solution, aqueous hydrochloric acid solution, and desalted water. Methylene chloride was poured into a large amount of methanol to separate out a polymer. The polymer was filtered and dried at room temperature for 24 hours in vacuo, thereby obtaining a polymer in the form of a white powder.

The yield of the polymer was 91%, and the $\eta_{inh}$ (in 0.5 g/dl methylene chloride, at 30° C.) of the polymer was 0.38 dl/g.

In the differential thermal analysis (DSC) of the polymer, a broad exothermic peak was observed in a temperature range of 130° to 160° C. When the polymer was heated to 130° C. for 5 hours, no exothermic peak was observed in the above temperature range. In the ultraviolet spectrum (UV) of the chloroform solution of the polymer, the maximum absorption was observed at 350 nm. In the polycarbonate obtained by polymerization without using 2,2'-azobis[2-methyl-N-(2-hydroxyethyl)propionamide], the exothermic peak in the DSC nor the maximum absorption at 350 nm in the UV was not observed. In the DSC and UV of 2,2'-azobis(2-methyl-N-(2-hydroxyethyl)propionamide, the exothermic peak was observed in the above temperature range and the maximum absorption was observed at 350 nm.

EXAMPLE 30

Preliminary reaction

Into a 100 ml four-necked flask, 1.136 g of 2,2'-azobis[2-methyl-N-(2-hydroxyethyl)propioneamide] and 30 g of NMP were charged to form a uniform solution. 3.200 g of isophthalic acid chloride was charged into the resultant solution and stirred at room temperature for 30 minutes to effect a reaction. Further, 2.699 g of bisphenol A was added thereto to effect a reaction for 30 minutes.

Production of polymer

Interface polymerization was carried out in the same way as in the production of the polymer in Example 29 except for using the thus-obtained preliminary reaction solution in place of the preliminary reaction solution in Example 29.

The yield of the polymer was 97%, and the $\eta_{inh}$ (in 0.5 g/dl methylene chloride, at 30° C.) was 0.65 dl/g. In DSC, a broad exothermic peak was observed and in UV, the maximum absorption was observed at 350 nm.

COMPARATIVE EXAMPLE 1

Interface polymerization was carried out in the same way as in the production of the polymer in Example 29 except for adding a solution of 1.136 g of 2,2'-azobis[2-methyl-N-(2-hydroxyethyl)propionamide] dissolved in 15 g of NMP and a solution of 3.200 g of isophthalic acid dissolved in 15 g of NMP without preliminary reaction.

The yield of the polymer was 88%, and the $\eta_{inh}$ (in 0.5 g/dl methylene chloride, at 30° C.) was 0.23 dl/g. In DSC, a broad exothermic peak was not observed in a temperature range of 130° to 160° C. and in UV, the maximum absorption was not observed at 350 nm.

COMPARATIVE EXAMPLE 2

Polymerization was carried out in the same way as in Comparative Example 1 except for using only a solution of 1.136 g of 2,2'-azobis[2-methyl-N-(2-hydroxyethyl)-propionamide] dissolved in 30 g of NMP without using dicarboxylic acid chloride.

The yield of the polymer was 90%, and the $\eta_{inh}$ (in 0.5 g/dl methylene chloride, at 30° C.) was 0.31 dl/g. In DSC and in UV, the exothermic peak and the maximum absorption based on the azo group were not observed.

EXAMPLE 31

Preliminary reaction

Into a 100 ml four-necked flask, 1.2 g of 2,2'-azobis (2-cyanopropanol) and 30 g of NMP were charged to form a uniform solution. 2.80 g of terephthalic acid chloride was charged into the solution and stirred at room temperature for 30 minutes to effect a reaction. Further, 2.5 g of bisphenol A was added thereto to effect a reaction for 30 minutes.

Production of polymer

Polymerization was carried out in the same way as in the polymer in Example 29 except for using the thus-obtained preliminary reaction solution in place of the preliminary reaction solution in Example 29.

The yield of the polymer was 95%, and the $\eta_{inh}$ (in 0.5 g/dl methylene chloride, at 30° C.) was 0.62 dl/g. In DSC, a broad exothermic peak was observed in a temperature range of 120° to 140° C. and in UV, the maximum absorption was observed at 350 nm.

EXAMPLE 32

Preliminary reaction

Into a 100 ml four-necked flask, 1.354 g of 2,2'-azobis{2[1-(2-hydroxyethyl)-2-imidazoline-2-yl]propane} and 30 g of NMP were charged to form a uniform solution. 3.6 g of sebacic acid chloride and 2.7 g of bisphenol A were charged into the solution to effect a reaction for 30 minutes.

Production of polymer

Polymerization was carried out in the same way as in the polymer in Example 29 except for using the thus-obtained preliminary reaction solution in place of the preliminary reaction solution in Example 29.

The yield of the polymer was 93%, and the $\eta_{inh}$ (in 0.5 g/dl methylene chloride, at 30° C.) was 0.54 dl/g. In DSC, a broad exothermic peak was observed in a temperature range of 120° to 180° C. and in UV, the maximum absorption was observed at 350 nm.

REFERENCE EXAMPLE 11

Into a 300 ml four-necked flask, 3.0 g of the azo group-containing polycarbonate obtained in Example 29, 37 g of NMP and 7.0 g of styrene were charged and subjected to nitrogen substitution under stirring. Thereafter, the resultant mixture was polymerized at 75° C. for 5 hours, and then at 130° C. for 1 hour. Afterwards the polymerization solution was dropped in a large amount of methanol. The polymer was washed with methanol several times, and thereafter dried at 100° C. for 24 hours in vacuo, thereby obtaining a polymer in the form of a white powder.

The rate of polymerization of styrene was 45%, and the $\eta_{inh}$ (in 0.5 wt % NMP, at 30° C.) of the polymer was 0.44 dl/g. The homopolymer of styrene was extracted by a Soxhlet apparatus by using cyclohexane as the extraction solvent. From the IR spectrum and 'H-NMR of the residual polymer, it was observed that styrene units and carbonate bonds existed and the polymer was a block copolymer. The rate of block copolymerized styrene to all the polymerized styrene (blocking efficiency) was 57%. The rate of polymerization of styrene was 9% in the experiment of polymerization without using the azo-group-containing polyamide (i.e., thermal polymerization).

REFERENCE EXAMPLE 12

Into a 300 ml four-necked flask, 3.0 g of the azo group-containing polycarbonate obtained in Example 30, 37 g of NMP and 7.0 g of styrene were charged and polymerized and treated thereafter in the same way as in Reference Example 11. The rate of polymerization of styrene was 47%, and the $\eta_{inh}$ (in 0.5 wt % NMP, at 30° C.) was 0.58 dl/g. The blocking efficiency was 64%.

What is claimed is:

1. A process for producing an azo group-containing polymer, comprising polycondensing a dicarboxylic acid chloride with a compound having an azo group in the main molecular chain and an alcoholic hydroxyl group, phenolic hydroxyl group, imino group or amino group at both the ends thereof, said azo group being not directly attached to an aromatic ring, in an aprotic solvent in the presence or absence of a dehydrochlorinating agent at a temperature of −10° to 40° C., the ratio of the amount of said compound having an azo group and the amount of said dicarboxylic acid chloride being determined so that the total molar amount of said alcoholic hydroxyl group, said phenolic hydroxyl group, said amino group or said amino group of said compound having an azo group is equivalent to the molar amount of the acid chloride group of said dicarboxylic acid chloride.

2. A process according to claim 1, wherein said compound having an azo group is polycondensed with said dicarboxylic acid chloride and a diamine compound having no azo group, a diol compound having no azo group or a mixture thereof, the ratio of said compound having an azo group being not less than 0.05 mol % of said diol compound, said diamine compound or a mixture thereof, and the ratio of the amount of said compound having an azo group, said diamine compound having no azo group, said diol compound having no azo group and the amount of said dicarboxylic acid chloride being determined so that the total molar amount of the alcoholic hydroxyl group, the phenolic hydroxyl group, the imino group and the amino group of said diol compound and the amino group of said diamine group is equivalent to the molar amount of the acid chloride group of said dicarboxylic acid chloride.

3. A process for producing an azo group-containing polymer, comprising polycondensing a compound having an azo group in the main molecular chain and a phenolic hydroxyl group, imino group or amino group at both the ends thereof, said azo group being not directly attached to an aromatic ring, with a carbonate precursor selected from the group consisting of compounds which produce a polycarbonate by reacting with a bisphenol compound and polycarbonate oligomer, in a non-water soluble organic solvent at a temperature of −10° to 40° C. in the presence of an inorganic base or an organic base and in the presence or absence of a catalyst.

4. A process according to claim 3, wherein said compound having an azo group is polycondensed with said carbonate precursor and a bisphenol compound having no azo group, the ratio of said compound having an azo group being not less than 0.05 mol % of said bisphenol compound.

5. A process for producing an azo group-containing polymer, which comprises reacting a compound having an azo group in the main molecular chain and an alcoholic hydroxyl group at both the ends thereof, said azo group being not directly attached to an aromatic ring, with a dicarboxylic acid chloride in an aprotic organic solvent at a temperature of $-10°$ to $40°$ C. in a proportion of 1 mol of said compound having an azo group to 1.1 to 10 mol of said dicarboxylic acid chloride to obtain a reaction product, and polycondensing said reaction product with a carbonate precursor selected from the group consisting of compound which produce a polycarbonate by reacting with a bisphenol compound and a polycarbonate oligomer through interfacial polymerization using an aqueous caustic soda solution and a non-water soluble organic solvent at a temperature of $-10°$ to $40°$ C. in the presence or absence of a catalyst.

6. A process according to claim 5, wherein said reaction product is polycondensed with said carbonate precursor and a bisphenol compound having no azo group, said bisphenol compound being used in an amount that the ratio of the unit derived from said compound having an azo group is not less than 0.05 mol % of the unit derived from said bisphenol compound in said azo group-containing polymer.

7. A process according to claim 5, wherein said reaction product is obtained by reacting said compound having an azo group with said dicarboxylic acid chloride and a bisphenol compound having no azo group.

8. A process according to claim 5, wherein said compound having an azo group is reacted with said dicarboxylic acid chloride and a bisphenol compound having no azo group, the molar number of said bisphenol compound used being not less than the difference in the molar number between said compound having an azo group and said dicarboxylic acid chloride to obtain a reaction product; and then said reaction product is polycondensed with said carbonate precursor and a bisphenol compound having no azo group, said bisphenol compound being used in an amount that the ratio of the unit derived from said compound having an azo group is not less than 0.05 mol % of the unit derived from said bisphenol compound in said azo group-containing polymer.

* * * * *